(12) United States Patent
Hirai

(10) Patent No.: US 6,255,882 B1
(45) Date of Patent: Jul. 3, 2001

(54) METHOD AND SYSTEM OF SWITCHING CLOCK SIGNAL

(75) Inventor: Miho Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/299,564

(22) Filed: Apr. 27, 1999

(30) Foreign Application Priority Data

Apr. 28, 1998 (JP) .................................................. 10-119777

(51) Int. Cl.[7] ....................................................... G06F 1/04
(52) U.S. Cl. ........................ 327/291; 327/299; 327/115; 327/116
(58) Field of Search ................................... 327/113, 115, 327/116, 291, 299, 365, 564, 99

(56) References Cited

U.S. PATENT DOCUMENTS

| | | | |
|---|---|---|---|
| 3,594,656 | * 7/1971 | Tsukamoto | 331/49 |
| 5,548,249 | * 8/1996 | Sumita et al. | 331/1 A |

FOREIGN PATENT DOCUMENTS

| | | |
|---|---|---|
| 58-40643 | 3/1983 | (JP) . |
| 5-94226 | * 4/1993 | (JP) . |
| 6-290281 | * 10/1994 | (JP) . |
| 8-8740 | * 1/1996 | (JP) . |
| 9-62396 | 3/1997 | (JP) . |
| 10-254576 | * 9/1998 | (JP) . |
| 10-301660 | 11/1998 | (JP) . |

OTHER PUBLICATIONS

Japanese Office Action, dated Sep. 11, 2000, with English language translation of Japanese Examiner's comments.*

* cited by examiner

*Primary Examiner*—Toan Tran
*Assistant Examiner*—Cassandra Cox
(74) *Attorney, Agent, or Firm*—McGuireWoods, LLP

(57) ABSTRACT

A method of switching a clock signal is provided, which switches the frequency of a clock signal while keeping the state of an internal subsystem just before a switching operation in a short period of time and at the same time, power consumption is finely adjustable. First, supply of a clock signal having a first frequency to an internal subsystem is stopped according to a clock-change instruction. Then, the first frequency of the clock signal is switched to a second frequency different from the first frequency while supply of the clock signal having the first frequency is stopped. Finally, supply of the clock signal having the second frequency is started to the internal subsystem. The supply of the clock signal to the internal subsystem may be stopped almost simultaneously with the clock-change instruction or stopped with a specific time delay with respect to the clock-change instruction.

10 Claims, 9 Drawing Sheets

METHOD AND SYSTEM OF SWITCHING CLOCK SIGNAL

BACKGROUND OF THE INVENTION

1. Field of the Invention

The present invention relates to a method and a system of switching a clock signal and more particularly, to a method and a system of switching the frequency of a clock signal according to a clock-signal switching instruction.

2. Description of the Prior Art

FIG. 1 is a block diagram showing the configuration of a portable computer system that carries out a conventional method of switching a clock signal disclosed in the Japanese Non-Examined Patent Publication No. 5-94226 published in 1993.

As shown in FIG. 1, this portable computer system comprises a Central Processing Unit (CPU) 1011 having an internal oscillator 1111, a reset-signal generator circuit 1012, a clock-signal selector circuit 1013, a timing controller circuit 1014, a clock-signal oscillator 1015, a frequency-divider circuit 1016, a trigger circuit 1017, a latch circuit 1018, a Random-Access Memory (RAM) 1019, a Programmable Interrupt Controller (PIC) 1020, a KeyBoard Controller (KBC) 1021, and a system timer 1022.

The CPU 1011, which controls the whole operation of the computer system, is connected to the timing controller circuit 1014, the RAM 1019, the PIC 1020, the KBC 1021, and the system timer 1022 through a system bus 1010. The internal oscillator 1111 of the CPU 1011 generates a dedicated clock signal having a frequency several times as much as that of a clock signal (CLK) supplied through the clock-signal selector circuit 1013. According to the dedicated clock signal thus generated by the oscillator 1111, the CPU 1011 operates at a higher speed than that of the case using the clock signal (CLK).

Also, the CPU 101 executes the Basic Input/Output System (BIOS) program called by an application program being executed, thereby judging whether the specific condition for entering the standby mode is satisfied or not. When this condition is satisfied, the CPU 1011 saves the content of the registers (not shown) in the CPU 1011 and executes a halt command for halting the execution of the program. The content of the registers thus saved are stored in the RAM 1019. After the execution of the halt command, the CPU 1011 advises the timing controller circuit 1014 that the CPU 1011 has entered the standby mode i.e., the halt or stop state.

The reset-signal generator circuit 1012 generates a reset signal (RESET) and supplies the reset signal thus generated to the CPU 1011. The circuit 1012 sets the reset signal active or inactive under the control of the timing controller circuit 1014. When the reset signal is turned active, the CPU 1011 enters the reset state. When the reset signal is turned inactive, the CPU 1011 is released from the reset state, in other words, it is returned to the normal operation mode.

The clock-signal selector circuit 1013 selects one of a high-frequency clock signal (CLK1) and a low-frequency clock signal (CLK2), supplying the selected one (i.e., CLK1 or CLK2) to the CPU 1011 as the operation clock signal (CLK). The circuit 1013 selects normally the high-frequency clock signal (CLK1) for high-speed operation of the CPU 1011. To shift the CPU 1011 from the normal operation mode to the standby mode, the circuit 1013 selects the low-frequency clock signal (CLK2) as the operation clock signal (CLK) instead of the high-frequency clock signal (CLK1) under the control of the timing controller circuit 1014.

The high-frequency clock signal (CLK1) is generated by the clock oscillator 1015. The low-frequency clock (CLK2) is generated by frequency-dividing the high-frequency clock signal (CLK1) by the frequency-divider circuit 1016.

The timing controller circuit 1014 controls the operation timing of the reset-signal generator circuit 1012 and the clock-signal selector circuit 1013. In detail, to turn the CPU 1011 from the normal operation mode to the standby mode, the circuit 1014 controls these two circuits 1012 and 1013 in such a way that the operation clock signal (CLK) is switched from the high-frequency clock signal (CLK1) to the low-frequency clock signal (CLK2) after the operation of the CPU 1011 has entered the reset state. On the other hand, to return the CPU 1011 from the standby mode to the normal operation mode, the circuit 1014 controls these two circuits 1012 and 1013 in such a way that the operation of the CPU 1011 is released from the reset state after the operation clock signal (CLK) has been switched from the low-frequency clock signal (CLK2) to the high-frequency clock signal (CLK1).

As seen from FIG. 1, the timing controller circuit 1014 is equipped with a register 1141 and two delay circuits 1142 and 1143. The register 1141 is used to set or store a message data issued by the CPU 1011, where the message data represents the halt or stop state of the CPU 1011. When the message data is set or stored in the register 1141, a reset-on signal (RESET-ON) is sent to the reset-signal generator circuit 1012 and the delay circuit 1143, thereby activating the reset signal (RESET). Thereafter, at the timing delayed by a specific period, a first switch signal (SW1) is sent from the delay circuit 1143 to the clock-signal selector circuit 1013, thereby switching the operation clock signal (CLK) to the low-frequency signal (CLK2).

When a trigger signal is inputted from the trigger circuit 1017 into the timing controller circuit 1014, a second switch signal (SW2) is sent from the delay circuit 1142 to the clock-signal selector circuit 1013, thereby returning the operation clock signal (CLK) to the high-frequency signal (CLK1). Then, at the timing delayed by a specific period, a reset-off signal is sent from the delay circuit 1142 to the reset-signal generator circuit 1012, thereby inactivating the reset signal.

When an interrupt signal (INT) is issued from the PIC 1020, the trigger circuit 1017 outputs the trigger signal in response to the interrupt signal thus issued. This interrupt signal is sent to the latch circuit 1018 also. The latch circuit 1018, which is of the transparent type, stores the interrupt signal and supplies it to the CPU 1011.

The RAM 1019 is used to store the application program executed by the CPU 1011. On the transition to the standby mode, the content of the registers in the CPU 1011 is also saved and stored in the RAM 1019.

The PIC 1020 outputs the interrupt signal in response to any hardware interrupt request such as a key-input interrupt request from the keyboard controller 1021, a timer interrupt request from the system timer 1022, and so on.

The keyboard controller 1021 outputs a hardware interrupt request according to a key input from a keyboard (not shown), informing the CPU 1011 of issuance of the key-input interrupt request.

The system timer 1022 outputs a hardware interrupt request at regular or constant intervals.

With the conventional method of switching a clock signal shown in FIG. 1, as described, above, the operation clock signal (CLK) is switched between the high- and low-frequency signals (CLK1 and CLK2) while the CPU 1011 is kept in the reset state. Then, the CPU 1011 is returned to the normal operation state from the reset state after the switching of the operation clock signal (CLK) is completed. Thus, the operation of the CPU 1011 is not affected by the non-contiguity of phase of the operation clock signal (CLK) caused by its switching operation between the signals CLK1 and CLK2.

Also, the content of the registers in the CPU 1011 is saved and stored in the RAM 1019 on reset of the CPU 1011, and then, the stored content of the registers is restored to the CPU 1011 on release of the CPU 1011 after the switching of the operation clock signal (CLK) is completed. Thus, the CPU 1011 can restart its operation from the state just before the switching operation of the clock signal (CLK). This means that the operation speed of the CPU 1011 can be switched while ensuring the normal operation of the CPU 1011.

The above-described conventional method of switching a clock signal shown in FIG. 1 has, however, the following problems.

First, on the switching operation of the operation clock signal (CLK), the CPU 1011 is reset (i.e., turned to the reset state) through the timing controller circuit 1014 and at the same time, the content of the registers in the CPU 1011 is saved and stored in the RAM 1019. Next, the operation clock signal (CLK) is switched from the high-frequency signal (CLK1) to the low-frequency signal (CLK2) while keeping the CPU 1011 in the reset state. Thereafter, the CPU 1011 is released from the reset state to the normal operation state and then, the content of the registers in the CPU 1011 stored in the RAM 1019 is restored to the registers in the CPU 1011.

Accordingly, the switching operation of the operating clock signal (CLK) necessitates the resetting time of the CPU 1011, the saving/storing time of the content of the registers in the CPU 1011, and the restoring time of the stored content of the registers in the CPU 1011. As a result, there is a problem that it takes a long time to switch the frequency of the operation clock signal (CLK).

Second, on the resetting operation of the CPU 1011, the state or information of the internal subsystem or internal circuitry except for the registers in the CPU 1011 is not saved and stored. Therefore, the state or information of the internal subsystem is changed by the resetting operation of the CPU 1011. As a result, there is a problem that the state or information of the internal subsystem just before the resetting operation may be unable to be restored after the resetting operation.

SUMMARY OF THE INVENTION

Accordingly, an object of the present invention to provide a method and a system of switching a clock signal that switches the frequency of a clock signal while keeping the state or information of an internal subsystem just before a switching operation of the clock signal.

Another object of the present invention to provide a method and a system of switching a clock signal that switches the frequency of a clock signal in a reduced period of time.

Still another object of the present invention to provide a method and a system of switching a clock signal in which power consumption is finely adjustable.

The above objects together with others not specifically mentioned will become clear to those skilled in the art from the following description.

According to a first aspect of the present invention, a method of switching a clock signal is provided, which is comprised of (a) stopping supply of a clock signal to an internal subsystem according to a clock-change instruction; the clock signal having a first frequency; (b) switching the first frequency of the clock signal to a second frequency different from the first frequency while supply of the clock signal having the first frequency is stopped; and (c) starting supply of the clock signal having the second frequency to the internal subsystem.

With the method of switching a clock signal according to the first aspect of the present invention, when the clock-change instruction is issued, the supply of the clock signal having the first frequency to the internal subsystem is stopped, thereby stopping the operation of the internal subsystem. Then, while keeping the stop state of supply of the clock signal having the first frequency, the first frequency of the clock signal is switched to the second frequency different from the first frequency. Thereafter, supply of the clock signal having the second frequency is started to the internal subsystem.

As a result, the frequency change or switching of the clock signal can be performed without changing the state or information of the internal subsystem existing just before the frequency change or switching. Also, reliability of the operation of the internal subsystem after the frequency change is improved.

Moreover, since the frequency change is performed without resetting the operation of the internal subsystem, the time required for returning the internal subsystem from its stop state to its normal operation state is reduced. Thus, the frequency change of the clock signal can be realized in a decreased or shorter period of time.

In the method of switching a clock signal according to the first aspect, the supply of the clock signal to the internal subsystem may be stopped almost simultaneously with the clock-change instruction or stopped with a specific time delay with respect to the clock-change instruction.

In a preferred embodiment of the method according to the first aspect, the timing to start supply of the clock signal having the second frequency to the internal subsystem is adjustable. In this embodiment, since the timing to start supply of the clock signal having the second frequency can be optionally set, there is an additional advantage that the power consumption is adjustable finely or minutely.

In another preferred embodiment of the method according to the first aspect, the clock signal is generated by a clock signal generator including a PLL circuit. In this embodiment, there is an additional advantage that the internal subsystem is readily transferred to its stop state.

According to a second aspect of the present invention, a system of switching a clock signal is provided, which is comprised of (a) a clock-signal stopping device for stopping supply of a clock signal to an internal subsystem according to a clock-change instruction; the clock signal having a first frequency; (b) a clock-signal switching device for switching the first frequency of the clock signal to a second frequency different from the first frequency while supply of the clock signal having the first frequency is stopped; and (c) a clock-signal supplying device for supplying the clock signal having the second frequency to the internal subsystem.

With the system of switching a clock signal according to the second aspect of the present invention, because of the same reason as described in the method according to the first aspect of the present invention, the frequency change or switching of the clock signal can be performed without changing the state or information of the internal subsystem existing just before the frequency change or switching. Also, reliability of the operation of the internal subsystem after the frequency change is improved. Moreover, the frequency change of the clock signal can be realized in a decreased or shorter period of time.

In the system of switching a clock signal according to the second aspect, the supply of the clock signal to the internal subsystem may be stopped almost simultaneously with the clock-change instruction or stopped with a specific time delay with respect to the clock-change instruction.

In a preferred embodiment of the system according to the second aspect, the timing to start supply of the clock signal having the second frequency to the internal subsystem is adjustable. In this embodiment, since the timing to start supply of the clock signal having the second frequency can be optionally set, there is an additional advantage that the power consumption is adjustable finely or minutely.

In another preferred embodiment of the system according to the second aspect, there is further provided with a clock signal generator for generating the clock signal. The clock signal generator includes a PLL circuit. In this embodiment, there is an additional advantage that the internal subsystem is readily transferred to its stop state.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
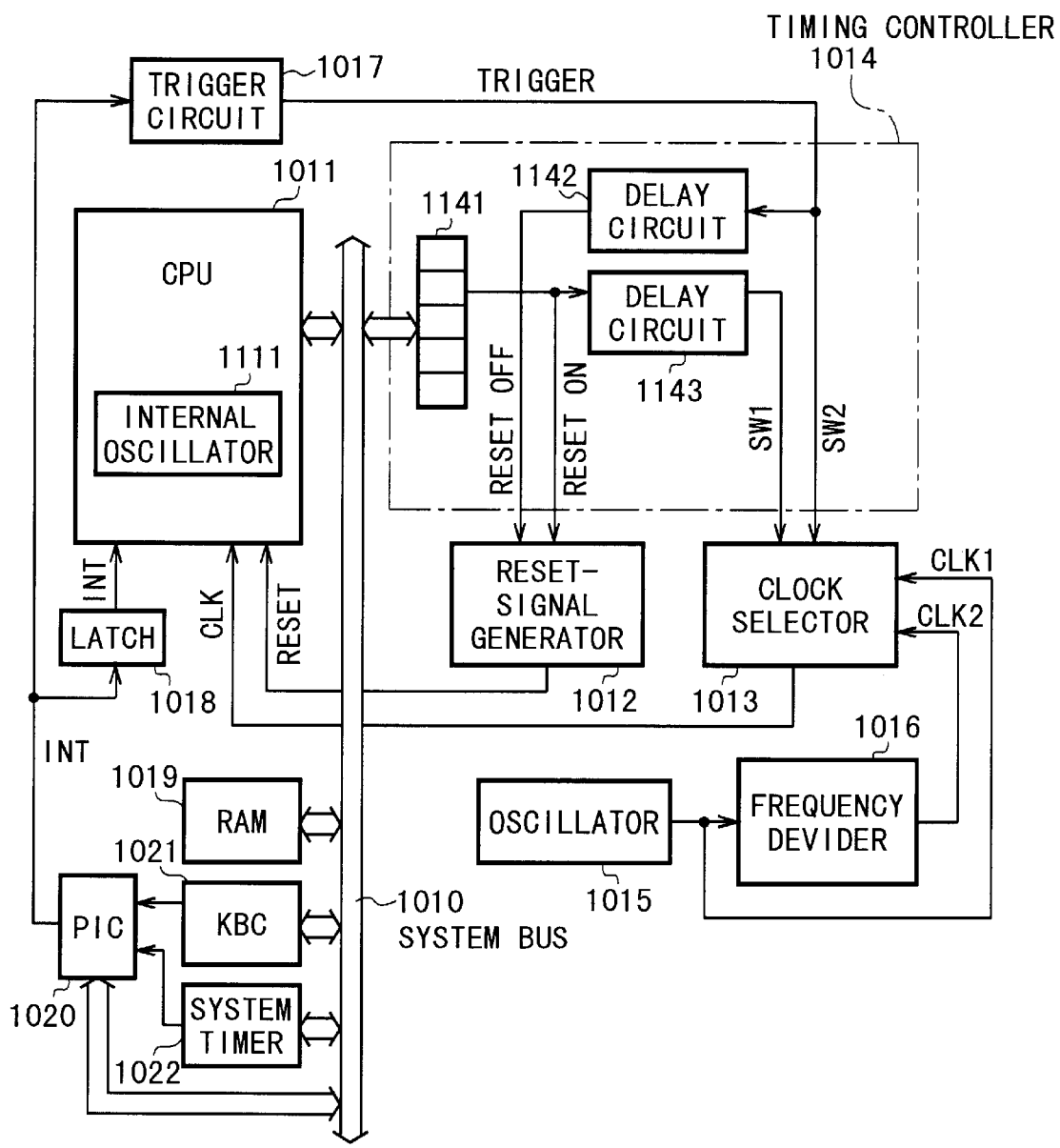
FIG. 1 is a block diagram showing the configuration of a portable computer system that carries out a conventional method of switching a clock signal.

Preferred embodiments of the present invention will be described in detail below while referring to the drawings attached.

Figure 2:
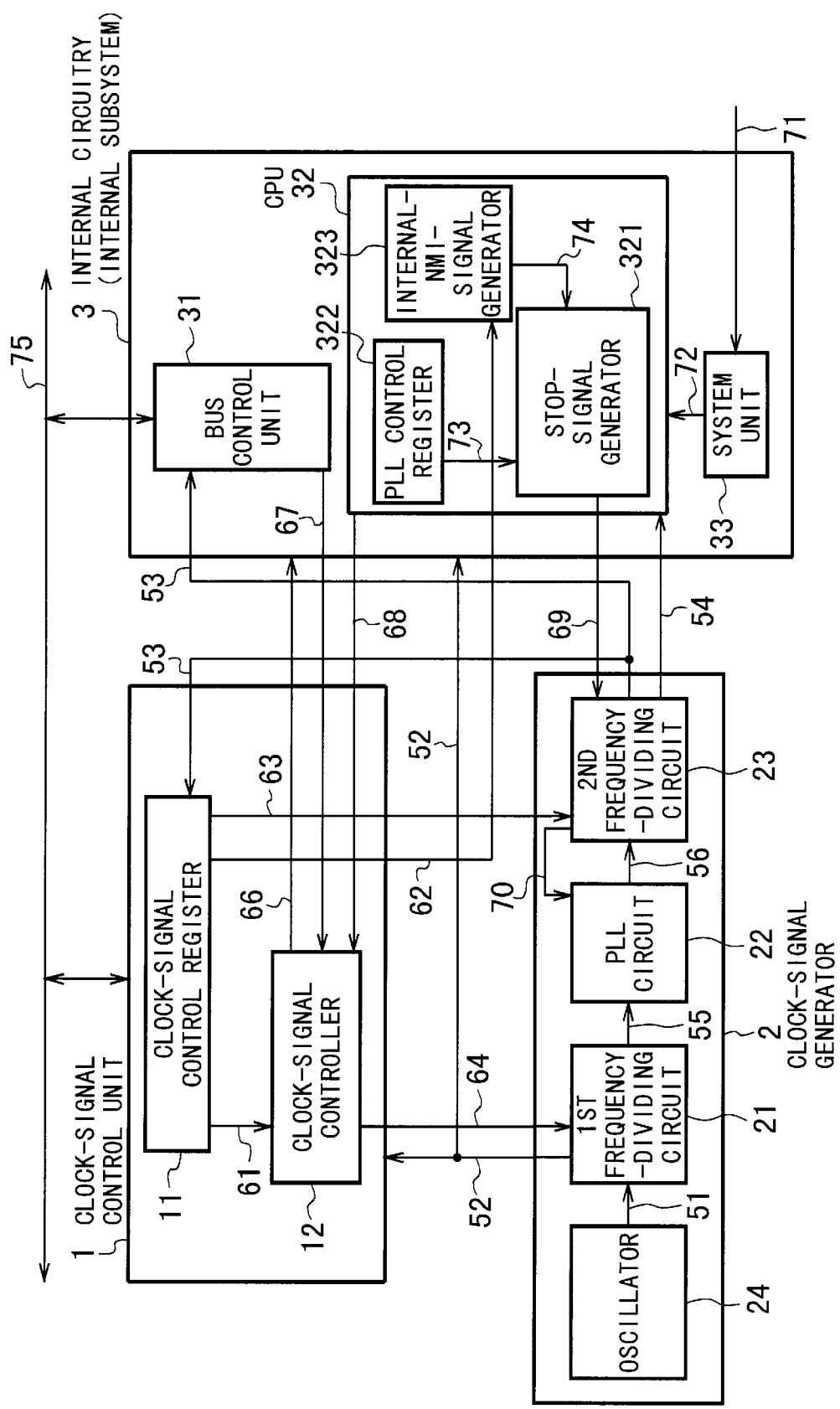
FIG. 2 is a block diagram showing the configuration of a data processing system that carries out a method of switching a clock signal according to an embodiment of the present invention.

A data processing system for performing a method of switching a clock signal according to an embodiment of the present invention is shown in FIG. 2.

This data processing system has a "normal operation mode" and a "standby mode". If a specific condition is satisfied, the system is transferred to the "standby mode" from the "normal operation mode" according to a standby instruction, thereby decreasing power consumption of the system. If any interrupt request is issued during the "standby mode", the system is immediately returned to the "normal operation mode" from the "standby mode".

CIRCUIT CONFIGURATION

As seen from FIG. 2, the data processing system comprises a clock signal generator circuit 2 for generating a clock signal, and a clock signal control unit 1 for controlling the clock signal thus generated by the circuit 2. The reference numeral 3 represents an internal circuitry or internal subsystem to which the clock signal is supplied. Although the internal circuitry or subsystem 3 includes various circuits other than those illustrated in FIG. 2, they are omitted from FIG. 2 because they have no relationship with the present invention.

Figure 3:
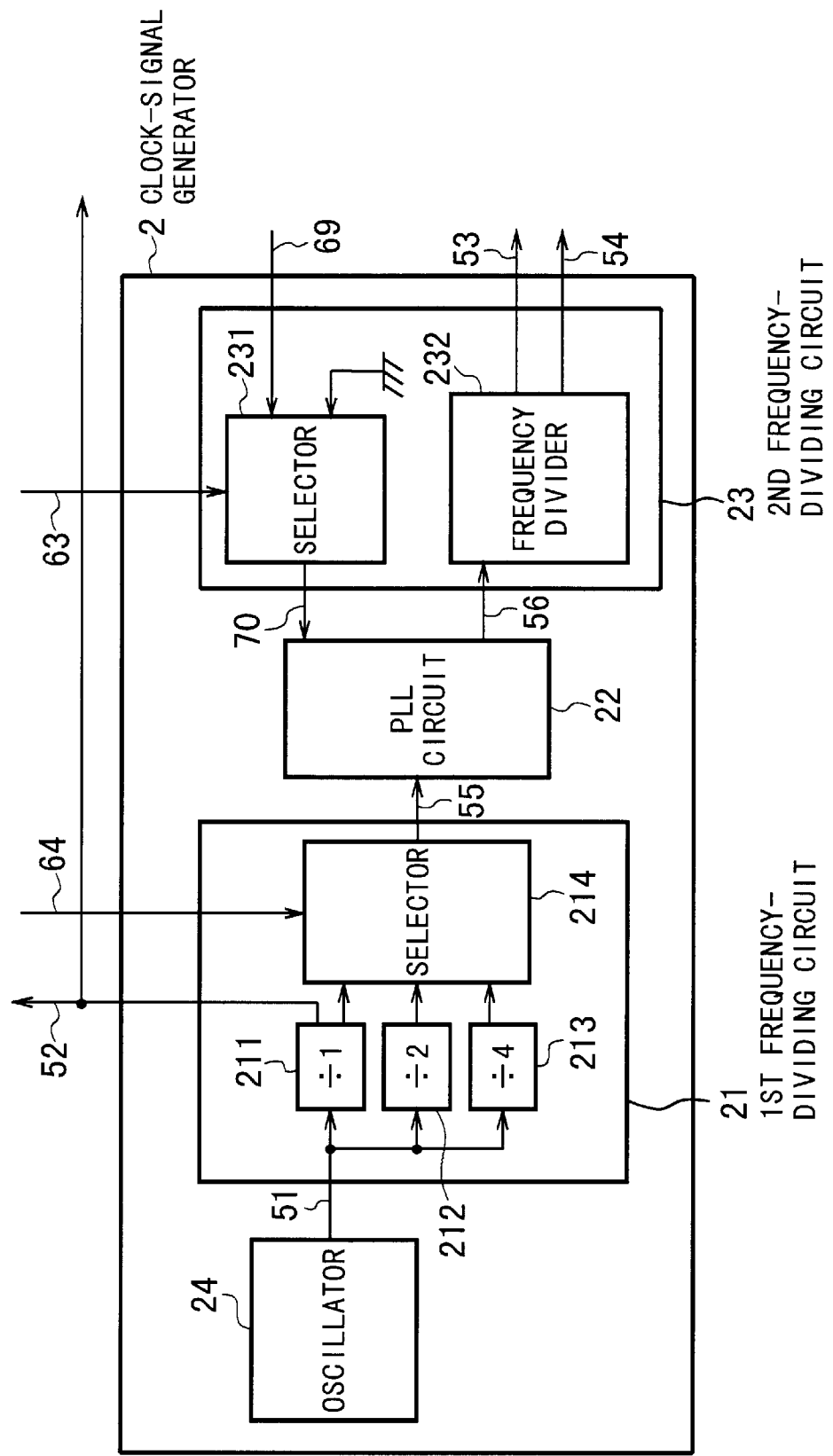
FIG. 3 is a detailed block diagram showing the clock-signal generator circuit of the data processing system shown in FIG. 2.

As shown in FIGS. 2 and 3, the clock signal generator circuit 2 has an oscillator 24, a first frequency-dividing circuit 21, a Phase-Locked Loop (PLL) circuit 22, and a second frequency-dividing circuit 23.

The oscillator 24 generates an oscillation signal 51 with a specific frequency and sends it to the first frequency-dividing circuit 21.

The first frequency-dividing circuit 21 has three frequency dividers 211, 212, and 213 for frequency-dividing operation of the oscillation signal 51 by the dividing factors (1/1), (1/2), and (1/4), respectively, and a selector 214 for selecting one of the three output signals of these dividers 211, 212, and 213.

The frequency divider 211 divides the frequency of the oscillation signal 51 by the factor (1/1) to send an output signal with an equal frequency to the signal 51 to the selector 214. On the other hand, the output signal with the equal frequency to the signal 51 is sent to the clock signal control unit 1 and the internal circuitry 3 as a base clock signal 52 of the data processing system. The frequency divider 212 divides the frequency of the oscillation signal 51 by the factor (1/2) to send an output signal with a half frequency of the signal 51 to the selector 214. The frequency divider 213 divides the frequency of the oscillation signal 51 by the factor (1/4) to send an output signal with a quarter frequency of the signal 51 to the selector 214.

The selector 214 selects one of the output signals of the dividers 211, 212, and 213 according to the dividing-factor selection signal 64 from the clock signal control unit 1 and then, sends the selected output signal to the PLL circuit 22 as a frequency-divided signal 55.

The PLL circuit 22 frequency-multiplies the frequency-divided signal 55 outputted from the first frequency-dividing circuit 21 by a specific factor to produce a frequency-multiplied signal 56. Then, the PLL circuit 22 sends the frequency-multiplied signal 56 thus produced to a frequency divider 232 of the second frequency-dividing circuit 23. The operation of the PLL circuit 22 can be stopped temporarily through a PLL-stop signal 70 sent from a selector 231 of the second frequency-dividing circuit 23.

The frequency divider 232 of the second frequency-dividing circuit 23 frequency-divides the frequency-multiplied signal 56 from the PLL circuit 22 by a specific factor, resulting in a frequency-divided frequency-multiplied signal. According to this frequency-divided frequency-multiplied signal, the frequency divider 232 outputs a Bus Control Unit (BCU) clock signal 53 and a CPU-clock signal 54. The BCU-clock signal 53 is supplied to a BCU 31 of the internal circuitry 3 and a clock-signal control register 11 of the clock signal control unit 1. The CPU clock signal 54 is supplied to the CPU 32 of the internal circuitry 3.

The selector 231 of the second frequency-dividing circuit 23 receives a PLL-stop signal 69 outputted from a stop-signal generator circuit 321 of the CPU 32 of the internal circuitry 3. Then, the selector 231 outputs the PLL-stop signal 70 to the PLL circuit 22 according to the content of the PLL-operation information 63 stored in the clock-signal control register 11 of the clock-signal control unit 1. The PLL-operation information 63 is the information representing whether the PLL circuit 22 is in its "stop mode" or "operation mode".

When the PLL circuit 22 is in the "stop mode", the operation of the PLL circuit 22 can be stopped. Thus, if the selector 231 of the second frequency-dividing circuit 23 knows that the PLL circuit 22 is in the "stop mode" through the PLL-operation information 63, the selector 231 outputs the PLL-stop signal 70 to the PLL circuit 22 in response to the PLL-stop signal 69 sent from the PLL stop-signal generator circuit 321 of the CPU 32, thereby stopping the operation of the PLL circuit 22.

On the other hand, when the PLL circuit 22 is in the "operation mode", the operation of the PLL circuit 22 cannot be stopped. Thus, if the selector 231 of the second frequency-dividing circuit 23 knows that the PLL circuit 22 is in the "operation mode" through the PLL-operation information 63, the selector 231 does not output the PLL-stop signal 70 to the PLL circuit 22, even if the selector 231 receives the PLL-stop signal 69 from the PLL stop-signal generator circuit 321.

The PLL circuit 22 stops its operation on receipt of the PLL-stop signal 70. If the PLL circuit 22 stops its operation, the circuit 22 does not output the frequency-multiplied signal 56, resulting in the supply of the BCU- and CPU-clock signals 53 and 54 being stopped. Due to stop of the supply of the BCU- and CPU-clock signals 53 and 54, the internal circuitry 3 stops its operation.

To cope with any interrupt signal requesting to return the data processing system from the "standby mode" to the "normal operation mode", the base clock signal 52 is directly outputted from the frequency divider 211 of the first frequency-dividing circuit 21 of the clock-signal generator circuit 2. Accordingly, the operation of the PLL circuit 22 has no relationship with supply and stop of the base clock signal 52. In other words, the base clock signal 52 is always supplied to the clock-signal control unit 1 and the internal circuitry or subsystem 3 independent of whether the operation of the PLL circuit 22 is stopped or not.

Figure 4:
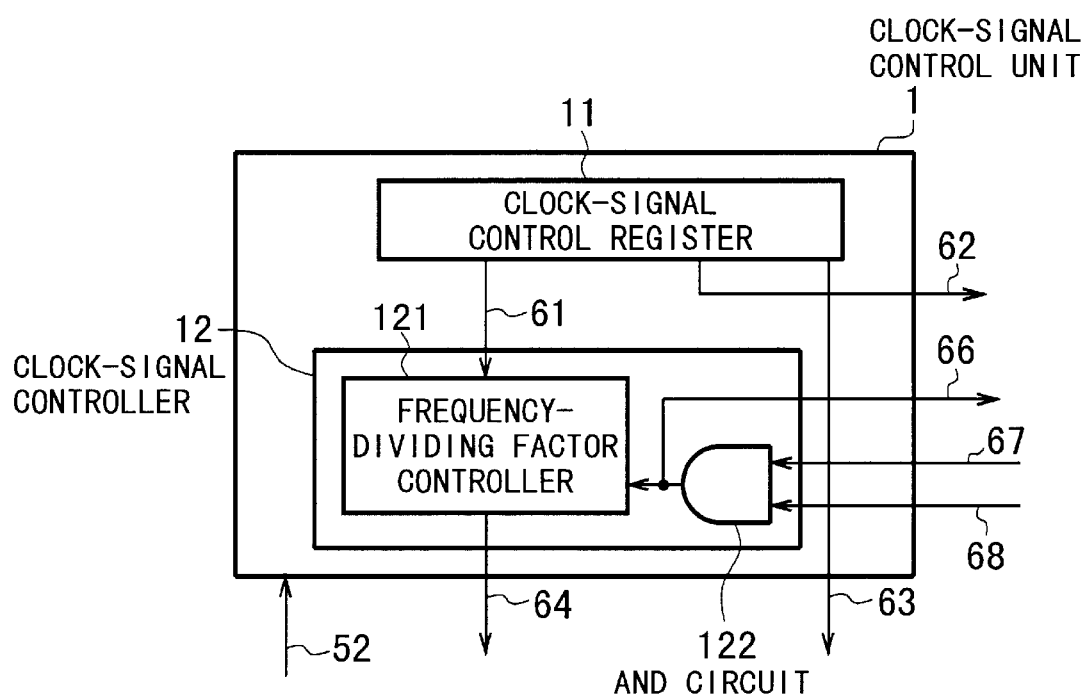
FIG. 4 is a detailed block diagram showing the clock-signal control unit of the data processing system shown in FIG. 2.

As shown in FIGS. 2 and 4, the clock-signal control unit 1 includes the clock signal control register 11 and the clock-signal controller circuit 12. The clock-signal controller circuit 12 has a frequency-dividing factor controller circuit 121 and an AND circuit 122. The frequency-dividing factor controller circuit 121 is typically formed by registers, counters, and so on. The AND circuit 122 receives a BCU-clock stop signal 67 sent from the BCU 31 and a CPU-clock stop signal 68 sent from the CPU 32. Then, the AND circuit 122 outputs a stop-mode start signal 66 to the frequency-dividing factor controller circuit 121 and the internal circuitry 3 when the circuit 122 receives both of the signals 67 and 68.

When the frequency-dividing factor controller circuit 121 receives the stop-mode start signal 66 from the AND circuit 122, the circuit 121 outputs a dividing-factor selection signal 64 to the selector 214 of the first frequency-dividing circuit 21 of the clock signal generator circuit 2 after a specific period of time is passed (i.e., after the PLL circuit 22 and the internal circuitry 3 stop their operation). The dividing-factor selection signal 64 designates the frequency of the frequency-divided signal 55 from the first frequency-dividing circuit 21. This output of the selection signal 64 is performed by reading the frequency-dividing factor information 61 stored in the clock-signal control register 11.

The selector 214 of the first frequency-dividing circuit 21 changes the dividing factor according to the dividing-factor selection signal 64 thus received, thereby changing the frequency of the frequency-divided signal 55. This frequency change of the signal 55 leads to frequency change of the BCU- and CPU-clock signals 53 and 54 through the frequency-multiplied signal 56 outputted from the PLL circuit 22.

The BCU 31 of the internal circuitry 3 is connected to the clock-signal control unit 1 through an internal bus 75, as shown in FIG. 2.

In the internal circuitry 3, as shown in FIG. 2, when the stop-mode starting signal 66 from the AND circuit 122 of the clock signal controller unit 1 is received, the stop-signal generator circuit 321 of the CPU 32 generates the PLL stop signal 69 to output it to the second frequency-dividing circuit 23 of the clock-signal generator circuit 2. Also, when a system Non-Maskable Interrupt (NMI) signal 72 is outputted from a system unit 33 or an internal-NMI signal 74 is outputted from an internal-NMI signal generator circuit 323 of the CPU 32, the stop-signal generator circuit 321 stops supplying the PLL stop signal 69 to the second frequency-dividing circuit 23, resulting in the internal circuitry 3 being returned from the "standby mode" to the "normal operation mode".

The BCU 31 of the internal circuitry 3 controls the internal bus 75 in the data processing system. Also, when a standby command is executed in the CPU 32, the BCU 31 outputs a BCU-clock stop signal 67 to the clock-signal controller circuit 12 of the clock-signal control unit 1.

The CPU 32 of the internal circuitry 3, which controls entirely the operation of the data processing system, is comprised of the stop signal generator 321, a PLL control register 322, and the internal NMI signal generator circuit 323. If a standby command is executed in the CPU 32, the CPU 32 outputs a CPU-clock stop signal 68 to the clock-signal controller circuit 12 of the clock-signal control unit 1.

As explained previously, if the clock signal control circuit 12 receives both of the BCU- and CPU-clock signals 67 and 68, the circuit 12 outputs the stop-mode start signal 66 to the internal circuitry 3, thereby turning the circuitry 3 into the "standby mode".

The internal-NMI signal generator circuit 323 of the CPU 32 generates the internal-NMI signal 74 based on the internal-NMI signal 62 sent from the clock-signal control register 11 and then, outputs the signal 74 to the stop-signal generator circuit 321. According to the signal 74, the stop-signal generator circuit 321 stops outputting the PLL stop signal 69 to the second frequency-dividing circuit 23.

The system unit 33 of the internal circuitry 3 receives an external-NMI signal 71 sent from the outside of the data processing system and outputs the system-NMI signal 72 to the CPU 32. In response to the signal 72, the stop-signal generator circuit 321 stops outputting the PLL-stop signal 69 to the second frequency-dividing circuit 23.

Thus, the stop-signal generator 321 of the CPU 32 outputs the PLL-stop signal 69 to the second frequency-dividing circuit 23 when it receives one of the internal-NMI signal 74 and the system-NMI signal 72.

In the "normal operation mode", when received the system-NMI signal 72, the CPU 32 stops temporarily its existing operation under execution and then, executes a suitable interrupt operation according to the content of the signal 72. After the execution of this interrupt operation is completed, the CPU 32 restarts to execute the prior operation that has been temporarily stopped.

Figure 5:
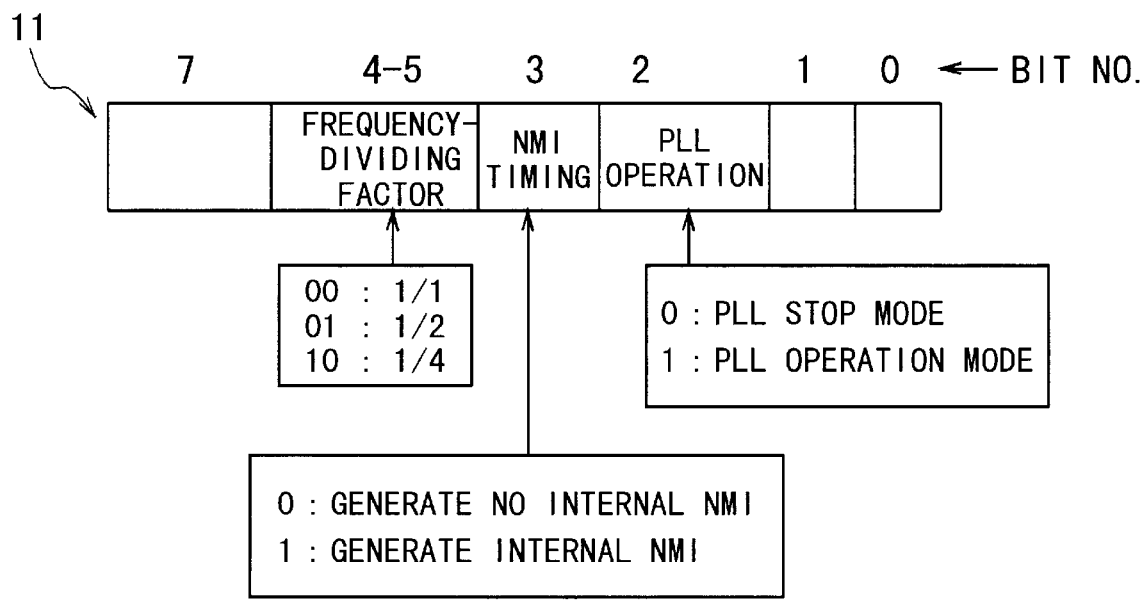
FIG. 5 is a schematic diagram showing the internal configuration of the clock-signal control register of the data processing system shown in FIG. 2.

FIG. 5 shows the internal configuration of the clock-signal control register 11 of the clock-signal control unit 1 of the data processing system shown in FIG. 2. As seen from FIG. 5, in this embodiment, the dividing-factor information 61 about the frequency-dividing factor is set and stored in the fourth and fifth bits of the register 11, the internal-NMI timing information 62 about the internal-NMI timing is in the third bit, the PLL-operation information 63 about the PLL operation mode is in the second bit.

Regarding the dividing-factor information 61, if the fourth and fifth bits have values "00", the frequency-dividing factor is set as (1/1). If the fourth and fifth bits have values "01", the frequency-dividing factor is set as (1/2), and if they have values "11", it is set as (1/4). The selection signal 64 outputted from the clock-signal controller circuit 12 is set as (1/1), (1/2), or (1/4) according to the content of the dividing-factor information 61.

Regarding the internal-NMI information 62, if the third bit has a value "0", once the PLL circuit 22 stops its operation, it continues to stop its operation until the external-NMI signal 71 is entered. If the third bit has a value "1", the internal-NMI signal 74 is generated in the internal-NMI signal generator 323 simultaneously with execution of a standby command.

Regarding the PLL-operation information 63, if the second bit has a value "0", the PLL circuit 22 is in the stop mode. If the second bit has a value "1", the PLL circuit 22 is in the operation mode. As described previously, if the PLL circuit 22 is in the "stop mode", the PLL stop signal 70 is sent to the PLL circuit 22 and as a result, the PLL circuit 22 stops its operation according to the signal 70. Due to this operation stop of the PLL circuit 22, the supply of the BCU- and CPU-clock signals 53 and 54 is stopped.

In the embodiment, the value of the second bit is fixed as "0", in other words, the PLL circuit 22 is fixed in the "stop mode" where the circuit 22 can stop its operation. This is to stop the supply of the clock signals 53 and 54 due to the stop of operation of the PLL circuit 22.

Additionally, the PLL-stop signal 70 is not supplied to the PLL circuit 22 in the "operation mode" and therefore, the PLL circuit 22 does not stop its operation in this mode. Thus, in this case, even if a standby command is executed, supply of the clock signals 53 and 54 to the internal circuitry 3 is not stopped. However, when the PLL circuit 22 needs to be designed not to stop its operation because of some reason, the PLL circuit 22 needs to be set in the "operation mode". If the PLL circuit 22 is set in the "operation mode", there is the need to provide any other means or device for the purpose of stopping the supply of the clock signals 53 and 54.

Figure 6:
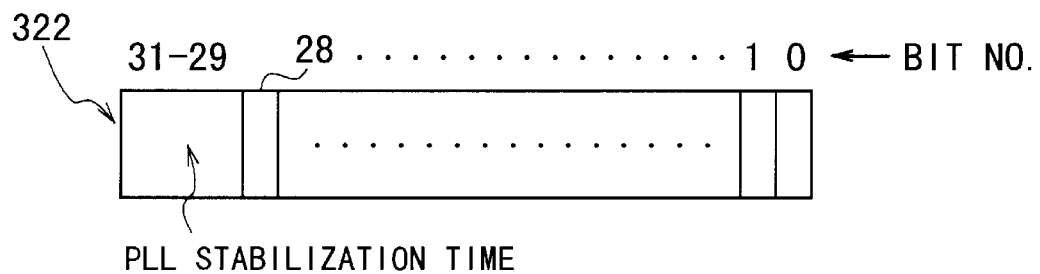
FIG. 6 is a schematic diagram showing the internal configuration of the PLL control register of the data processing system shown in FIG. 2.

FIG. 6 shows the internal configuration of the PLL control register 322 of the CPU 32 of the data processing system shown in FIG. 2, where the register 322 has 32 bits. In the embodiment, the PLL stabilization-time information 73 is stored in the 31st to 29th bits of the register 322. According to the values of the 31st to 29th bits of the register 322, the "PLL stabilization time", which is defined as a time from the start of oscillation of the PLL circuit 22 in the "stop mode" to the stabilization of its operation, is specified.

CIRCUIT OPERATION

Next, the operation of the data processing system having the above-described configuration is explained below with reference to FIGS. 7A to 7G and 8A to 8G.

Figure 7A:
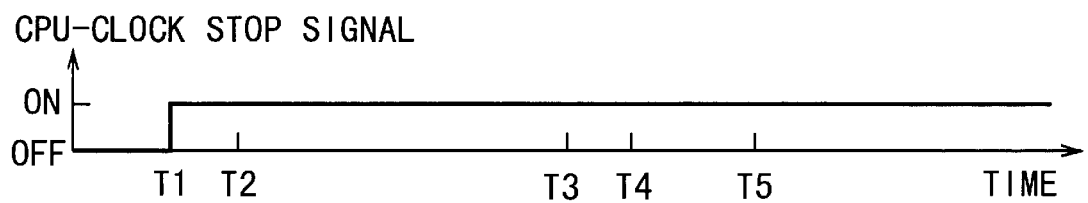
FIGS. 7A to 7G are timing charts showing the frequency-switching operation of the clock signal in the method of switching a clock signal according to the embodiment of the present invention, respectively.
Figure 7B:
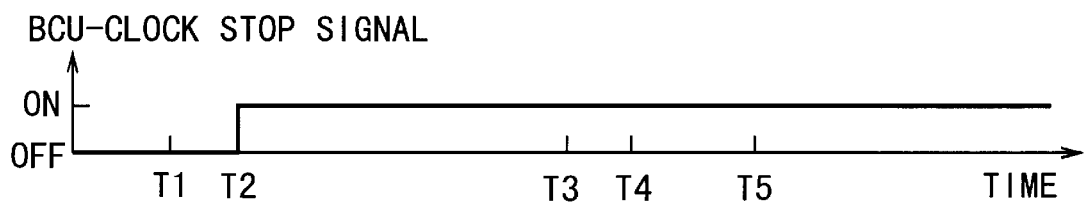

When a standby command is executed in the CPU 32 during the "normal operation mode" of the data processing system, as shown in FIG. 7A, the CPU 32 sends the CPU-clock stop signal 68 to the clock-signal controller circuit 12 of the clock-signal control unit 1 at a time T1. At a time T2 slightly later than the time T1, the BCU 31 sends the BCU-clock stop signal 67 to the clock-signal controller circuit 12, as shown in FIG. 7B.

The timing of the signals 67 and 68 may be replaced with each other. Specifically, the BCU-clock stop signal 67 may be sent at the time T1 and then, the CPU-clock stop signal 68 may be sent at the time T2.

Figure 7C:
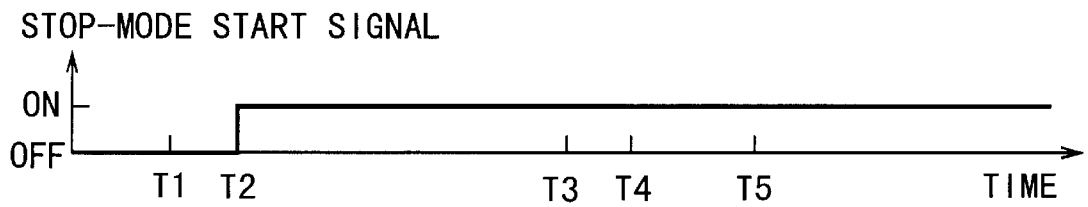

At the time T2 when both of the stop signals 67 and 68 are supplied to the clock-signal controller circuit 12, the circuit 12 sends the stop-mode start signal 66 to the frequency-dividing factor controller circuit 121 of the circuit 12 and the internal circuitry 3, as shown in FIG. 7C.

Figure 7D:
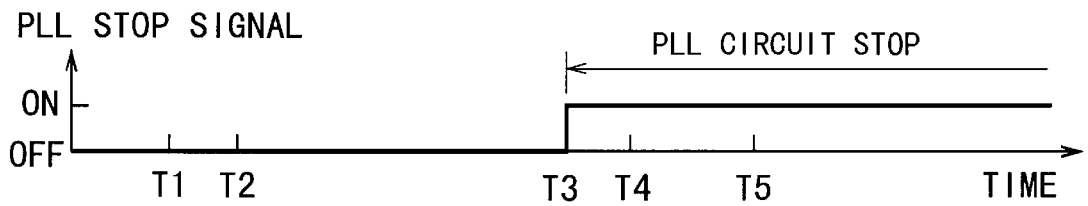

In response to the stop-mode start signal 66 thus sent, the stop-signal generator circuit 321 of the CPU 32 sends the PLL-stop signal 69 to the second frequency-dividing circuit 23 of the clock-signal generator circuit 2 at a time T3 later than the time T2, as shown in FIG. 7D.

Using the PLL-operation information 63 stored in the clock-signal control register 11 of the clock-signal control unit 1, the second frequency-dividing circuit 23 notices that the PLL circuit 22 is in the "stop mode". Thus, the circuit 23 sends the PLL stop signal 70 to the PLL circuit 22 at the time T3 in response to the PLL-stop signal 69, thereby stopping the operation of the PLL circuit 22. As a result, supply of the BCU- and CPU-clock signals 53 and 54 to the internal circuitry 3 are stopped, as shown in FIGS. 7F and 7G, thereby stopping the operation of the circuitry 3 at a time (not specified in FIGS. 7A to 7G) slightly later than the time T3.

Figure 7E:
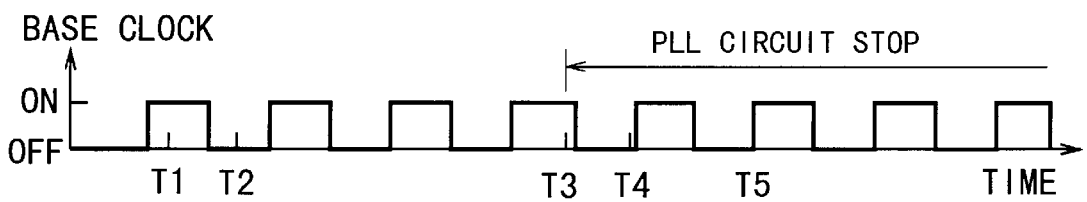
Figure 7F:
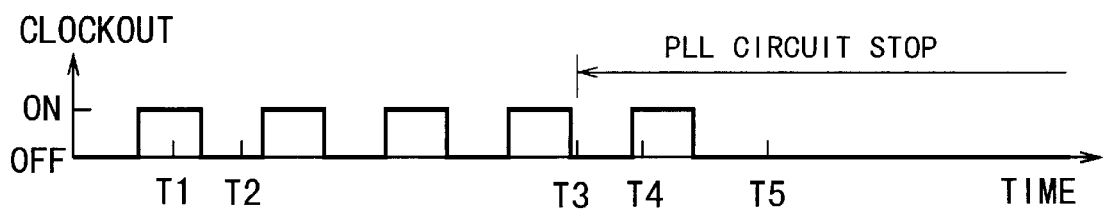
Figure 7G:
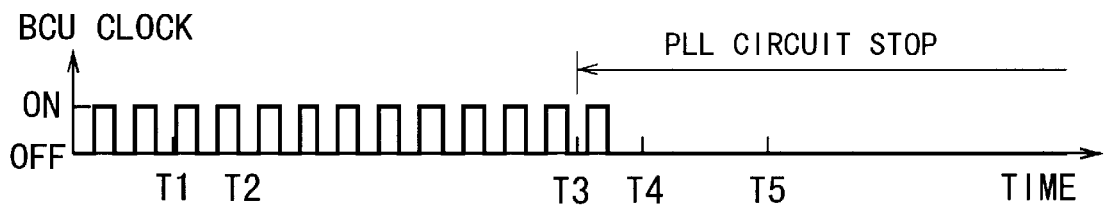

During the period in which the PLL circuit 22 stops its operation, to cope with any new interrupt request and return to the "normal operation mode", only the base clock signal 52 is kept supplied to the clock-signal control unit 1 and a part of the internal circuitry 3, as shown in FIG. 7E.

On the other hand, after a specific time later than the time T2 when both of the clock stop signals 67 and 68 are supplied (at any time between two times T4 and T5), the frequency-dividing factor controller circuit 121 of the clock-signal controller circuit 12 gets or reads the dividing-factor information 61 stored in the clock-signal control register 11 to thereby produce the selection signal 64. Then, the circuit 121 supplies the selection signal 64 thus produced to the first frequency-dividing circuit 21 of the clock-signal generator 2. According to the content of the selection signal 64, the selector 214 of the circuit 21 selects one of the three frequency-dividing factors (1/1), (1/2), and (1/4) and outputs the selected one as the frequency-divided signal 55. Thus, while the operation of the internal circuitry 3 is stopped, the frequency of the clock signals 53 and 54 are able to be changed or switched.

Subsequently, the returning operation of the data processing system from the "standby mode" to the "normal operation mode" is performed, which is explained below with reference to FIGS. 8A to 8G.

The timing of the returning operation of the PLL circuit 22 from the "stop mode" to the "operation mode" is specified by the internal-NMI timing information 62, i.e., the value of the third bit of the clock-signal control register 11. If the value of the third bit of the register 11 is "0", after the PLL circuit 22 stops its operation at the time T3, the operation of the circuit 22 is kept stopped until the external-NMI signal 71 is supplied. If the value of the third bit of the register 11 is "1", the internal NMI signal 74 is outputted from the internal-NMI signal generator 323 simultaneously with execution of the standby command.

Figure 8A:
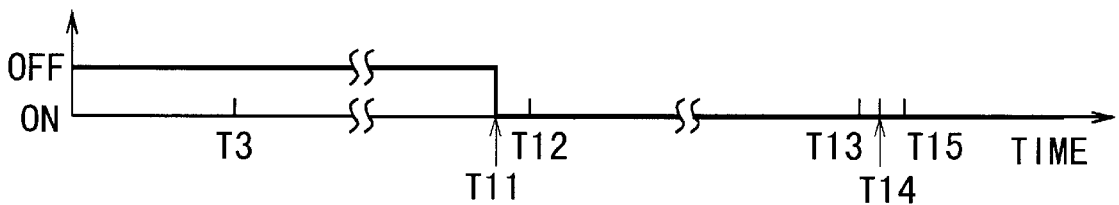
FIGS. 8A to 8G are timing charts showing the returning operation from the standby mode to the normal operation mode in the method of switching a clock signal according to the embodiment of the present invention, respectively.
Figure 8B:
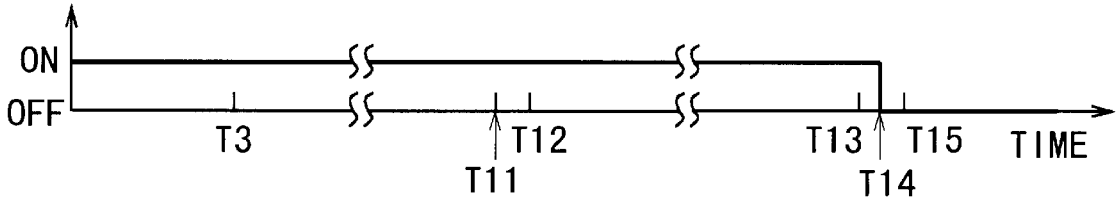
Figure 8C:
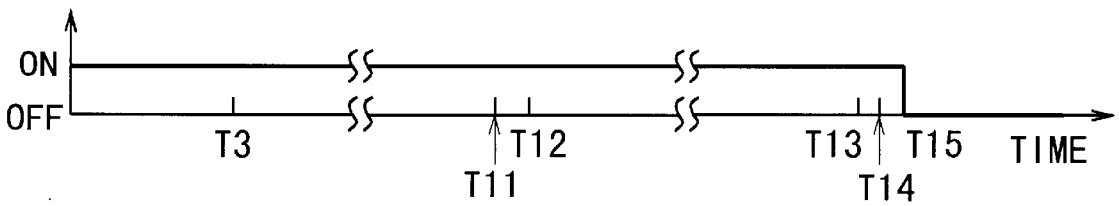
Figure 8D:
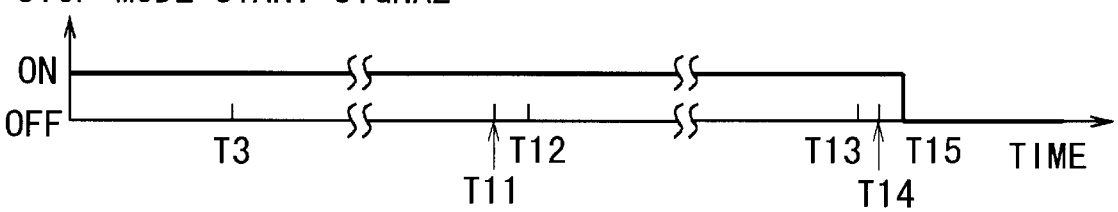
Figure 8E:
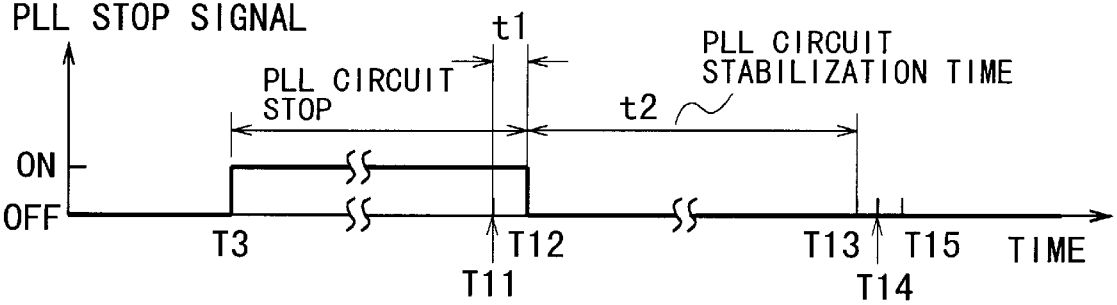

If the stop-signal generator 321 of the CPU 32 receives the system- or internal-NMI signal 72 or 74 at a time T11, the output of the PLL stop signal 69 is stopped at a time T12 later than the time T11 by a period t1, as shown in FIGS. 8A and 8E. Then, the PLL circuit starts its normal operation. Furthermore, at a time T13 later than the time T12 by a period t2 equal to the stabilization time of the PLL circuit 22, the operation of the PLL circuit 22 is stabilized, as shown in FIG. 8E. The stabilization time (i.e., t2) of the PLL circuit 22 corresponds to the stabilization-time information 73 specified by the values of the 31st to 29th bits of the PLL control register 322. As a result, the second frequency-dividing circuit 23 of the clock-signal generator circuit 2 starts supplying the CPU- and BCU-clock signals 53 and 54.

If the output of the CPU-clock stop signal 68 is stopped at a time T14 later than the time T13, the output of the stop-mode start signal 66 is also stopped at a time T15 slightly later than the time T14, as shown in FIGS. 8B and 8D. This operation is carried out corresponding to the AND logic of the AND circuit 122 of the clock signal control circuit 12. Furthermore, the output of the BCU-clock stop signal 67 is stopped at the time T15, as shown in FIG. 8C.

As the case may be, the output of the BCU-clock stop signal 67 may be stopped at the time T14 and then, the output of the CPU-clock stop signal 68 may be stopped at the time T15.

Figure 8F:
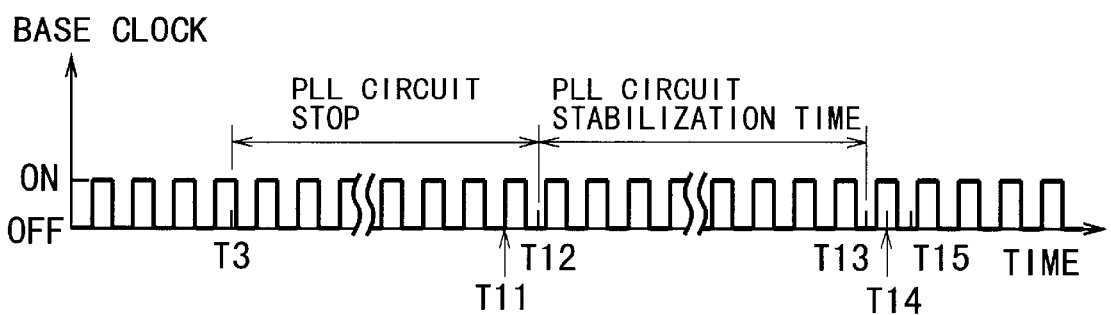
Figure 8G:
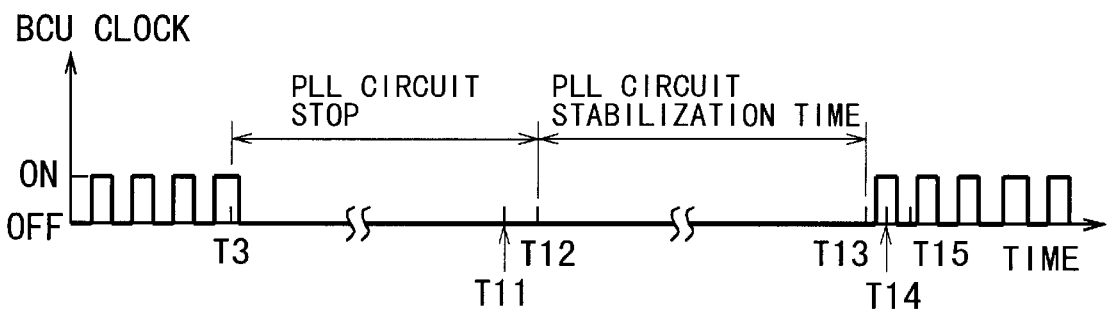

As shown in FIGS. 8F and 8G, the base clock signal 52 is kept supplied to the clock-signal control unit 1 and the part of the internal circuitry 3. The supply of the BCU clock signal 53 is started immediately after the time T13 when the stabilization time t2 of the PLL circuit 22 is passed.

As explained above, with the method of switching a clock signal according to the embodiment of the present invention, when a standby command is executed in the CPU 32, the CPU-clock stop signal 68 and the BCU-clock stop signal 67 are outputted. In this embodiment, the standby command serves as the clock-change signal or instruction.

In response to the clock-change signal or the standby command, the system is transferred from the "normal operation mode" to the "standby mode" and then, the frequencies of the CPU- and BCU-clock signals 54 and 53 are switched.

On the frequency-switching operation, supply of the clock signals 54 and 53 are stopped in advance, thereby stopping the operation of almost all the internal circuitry 3. While keeping the state where the operation of the internal circuitry 3 is stopped, the frequency switching of the signals 54 and 53 is carried out. Thereafter, the supply of the clock signals 54 and 53 having new frequencies is started to the internal circuitry 3.

As a result, the frequency change or switching of the clock signals 54 and 53 can be performed without resetting the CPU 32, in other words, without changing the information or state of the internal circuitry 3 existing just before the frequency change or switching. Also, reliability of the operation of the internal circuitry 3 after the frequency change is improved.

Moreover, since the frequency change is performed without resetting the operation of the internal circuitry 3, the time required for returning from the standby mode or operation-stop state of the internal circuitry 3 to the normal operation mode is decreased. Thus, the frequency change of the clock signals 54 and 53 can be realized in a shorter time than that of the conventional method shown in FIG. 1.

Additionally, by adjusting the timing of the internal-NMI timing signal 62 using the clock-signal control register 11, in other words, by setting the value of the third bit of the register 11 as "1", the internal-NMI signal can be generated at the same time with execution of the standby command. In this case, supply of the clock signals 53 and 54 is stopped and then, the PLL stop signal 69 is turned OFF immediately after the change of the frequency-dividing factor. Thus, the switching time for clock signal frequency is drastically decreased compared with the conventional method shown in FIG. 1.

If the timing of generation or output of the internal NMI signal 62 is suitably adjusted, the timing to restart supply of the clock signals 54 and 53 to the internal circuitry 3 can be adjusted optionally. Thus, there is an additional advantage that the power consumption can be adjusted finely or minutely.

For example, necessary peripheral I/O circuits are operated using the clock signals 54 and 53 with low frequencies and then, supply of the signals 54 and 53 is stopped simultaneously with the finish of the operation of the peripheral I/O circuits. Then, while the supply of the signal 54 and 53 is stopped, the frequencies of the signals 54 and 53 are changed to higher frequencies by decreasing the frequency-dividing factor. Thereafter, it is waited to restart the supply of the signals 54 and 53 due to any interrupt request. In this case, there is an additional advantage that both of power consumption decrease and high-speed restart of the operation can be accomplished.

VARIATIONS

In the above-described embodiment of the present invention, the first frequency-dividing circuit 21 is equipped with the three frequency dividers 211, 212, and 213. However, the number of the frequency dividers may be changed as necessary. Although the first frequency-dividing circuit 21 is located at a prior stage to the PLL circuit 22 in the above embodiment, the circuit 21 may be a post stage of the PLL circuit 22 and may be combined with the second frequency-dividing circuit 23. The clock signal generator circuit 2 may have any configuration if it includes a PLL circuit.

Furthermore, the supply of the BCU- and CPU-clock signals 53 and 54 to the internal circuitry 3 is stopped by stopping the operation of the PLL circuit 22 in the above embodiment. However, the present invention is not limited to this configuration. The supply of the clock signals 53 and 54 may be stopped by any other device or means without stopping the operation of the PLL circuit 22.

For example, if the frequency-multiplied signal 56 from the PLL circuit 22 is outputted to the second frequency-dividing circuit 23 through any signal-stop circuit. In this case, the supply of the clock signals 53 and 54 can be stopped without stopping the operation of the PLL circuit 22 by using the signal-stop circuit. To realize this, the second bit of the clock-signal control register 11 is set as "1" and the PLL circuit 22 is set in the "operation mode". Then, the supply of the clock signals 53 and 54 is designed to be stopped by activating the signal-stop circuit.

The present invention is applied to a data processing system in the above-described embodiment. However, it is needless to say that the invention may be applied any other system (e.g., various types of computers) if they are digital systems capable of switching the clock signal or signals.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A method of switching a clock signal in a digital system having an internal subsystem, comprising:
   (a) stopping supply of a clock signal for said internal subsystem according to a clock-change instruction while maintaining supply of a base clock signal to a portion of said digital system;
   said clock signal having a first frequency;
   (b) switching said first frequency of said clock signal to a second frequency different from said first frequency while supply of said first clock signal having said first frequency to said internal subsystem is stopped; and
   (c) starting supply of said clock signal having said second frequency to said internal subsystem, wherein said stopping supply of said clock signal is performed responsive to a CPU-stop signal and a bus control unit stop signal and said starting supply of said clock signal is performed responsive to an interrupt signal and said base clock signal.

2. The method as claimed in claim 1, wherein said supply of said clock signal having said first frequency to said internal subsystem is stopped almost simultaneously with said clock-change instruction.

3. The method as claimed in claim 1, wherein supply of said clock signal having said first frequency is stopped with a specific time delay with respect to said clock-change instruction.

4. The method as claimed in claim 1, wherein a timing to start said supply of said clock signal having said second frequency to said internal subsystem is adjustable.

5. The method as claimed in claim 1, wherein said clock signal is generated by a clock signal generator including a PLL circuit.

6. A system of switching a clock signal in a digital system having an internal subsystem, comprising
   (a) a clock-signal stopping device for stopping supply of a clock signal for said internal subsystem according to a clock-change instruction while supplying a base clock signal to a portion of said digital system;
   said clock signal having a first frequency;
   (b) a clock-signal switching device for switching said first frequency of said clock signal to a second frequency different from said first frequency while supply of said clock signal having said first frequency is stopped; and
   (c) a clock-signal supplying device for supplying said clock signal having said second frequency to said internal subsystem, wherein said clock-signal stopping device is responsive to a CPU-stop signal and a bus control unit stop signal and said clock signal supplying device is responsive to an interrupt signal and said base clock signal.

7. The system as claimed in claim 6, wherein said supply of said clock signal to said internal subsystem is stopped almost simultaneously with said clock-change instruction.

8. The system as claimed as claim 6, wherein said supply of said clock signal to said internal subsystem is stopped with a specific time delay with respect to said clock-change instruction.

9. The system as claimed in claim 6, wherein a timing to start said supply of said clock signal having said second frequency to said internal subsystem is adjustable.

10. The system as claimed in claim 6, wherein said clock signal is generated by a clock signal generator including a PLL circuit.

* * * * *